United States Patent

[11] 3,608,521

| [72] | Inventor | Georg Gopel<br>Frankfurt am Main, Germany |
|---|---|---|
| [21] | Appl. No. | 844,519 |
| [22] | Filed | July 24, 1969 |
| [45] | Patented | Sept. 28, 1971 |
| [73] | Assignee | Maschinenfabrik Moenus AG<br>Frankfurt am Main, Germany |
| [32] | Priority | July 27, 1968 |
| [33] | | Germany |
| [31] | | P 17 60 978.8 |

[54] APPARATUS FOR APPLYING ADHESIVE
5 Claims, 3 Drawing Figs.

[52] U.S. Cl. .................................................... 118/202,
118/211, 222/361
[51] Int. Cl. ............................................... B05c 1/02
[50] Field of Search ........................................ 118/202,
266, 211; 141/238; 222/361

[56] References Cited
UNITED STATES PATENTS

| 2,113,684 | 4/1938 | Edwards ...................... | 118/211 UX |
| 3,380,633 | 4/1968 | DuBois ........................ | 141/238 X |
| 3,411,479 | 11/1968 | Hutchinson .................. | 222/361 X |

*Primary Examiner*—John P. McIntosh
*Attorney*—Michael S. Striker

ABSTRACT: A support has a heated contact surface onto which the margin of a lasted insole is to be placed. A supply arrangement is located spaced from the support and supplies particulate dry powdered substance thermoplastic adhesive. A transfer device receives quantities of the adhesive powder from the supply arrangement and deposits them on the heated surface without coming in contact with the latter. The adhesive melts when heated by engagement with the contact surface and is then ready for application to the margin of an insole which is to be connected with a shoe upper.

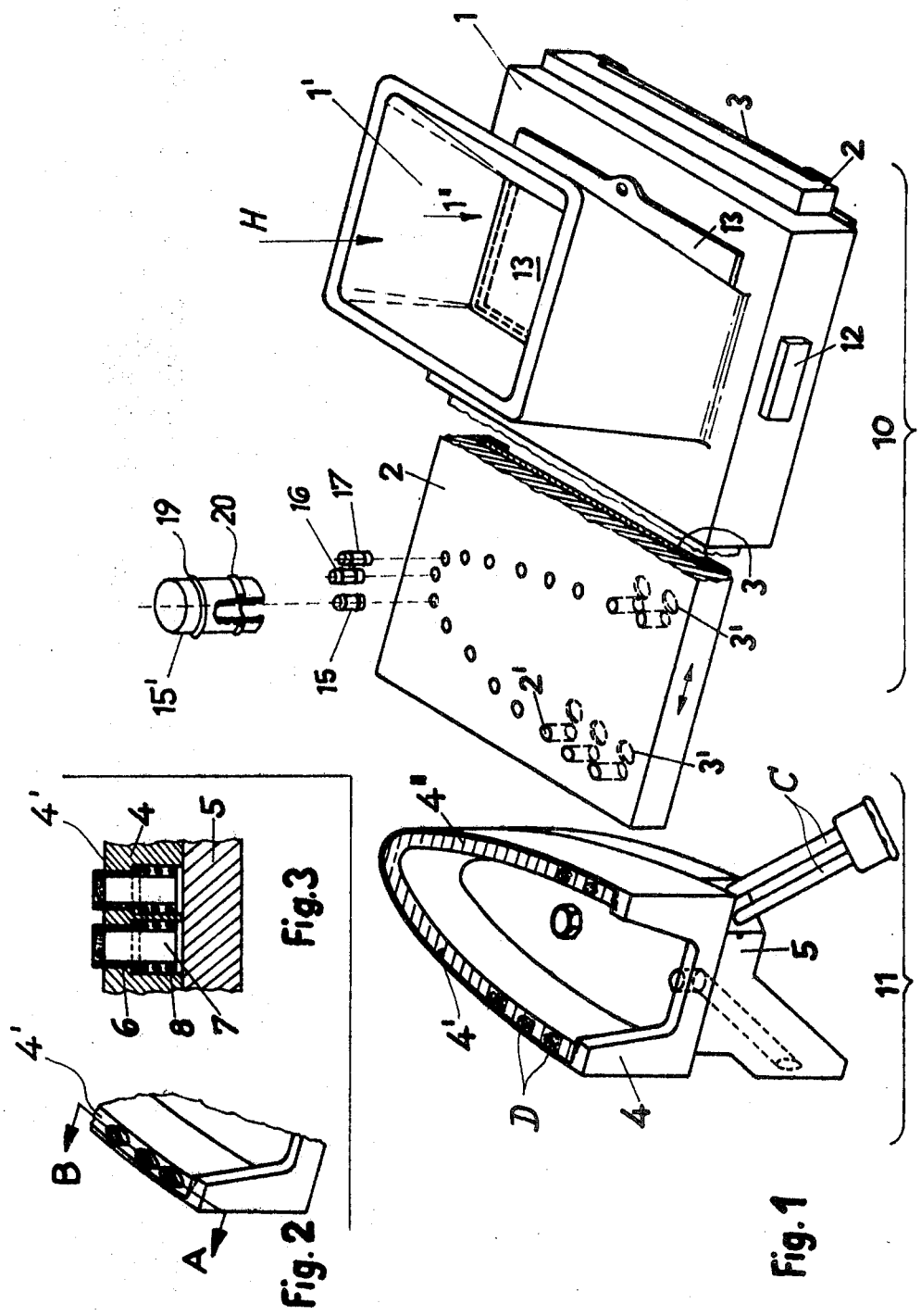

3,608,521

APPARATUS FOR APPLYING ADHESIVE

BACKGROUND OF THE INVENTION

The present invention relates generally to an apparatus for applying adhesives, and more particularly to an apparatus for applying an adhesive to the insole supported on a last in a toe and side lasting machine.

In machines of the above type, the marginal portion of the material forming the upper of the shoe is wiped over the margin of the insole so as to overlie the same, and bonded to this margin. To effect the bonding it has heretofore been common in the shoe industry to use adhesives which could be separately applied to the insole and the upper whereupon the thustreated articles could be stored for a certain time. When the insole and the upper were subsequently to be united, they were subjected to an initial heat treatment to activate the adhesive and subsequently to an additional heat treatment and pressure to bond them to one another. However, the storage of the prepared articles, the subsequent activation of the adhesive and the bonding of the articles naturally require additional operating steps which have been felt to be unnecessary. In order to overcome this problem, it has recently been the custom to heat the adhesive material in order to liquefy it, and to supply the liquefied adhesive through heated supply conduits to a heated last support. The last support is formed with ejection nozzles through which the adhesive is ejected onto the insole. The practice is to eject a multiple of the quantity of adhesive which is actually needed for effecting the bonding and to collect the excess adhesive in heated grooves which return it to the reservoir. Because the adhesives employed deteriorate under the influence of elevated temperatures and if subjected to heating for prolonged periods of time, they lose their bonding ability if they remain for a prolonged period of time in the circulatory system and are subjected to repeated melting and setting. Aside from this there is the fact that inevitably they will collect impurities. The result of all this is that excessive quantities of adhesive are used, a fact which necessarily increases the expense of producing shoes because the adhesive is relatively costly. Furthermore, improper bonding as a result of decreased bonding ability of the adhesive leads to excessively high rejection rates for the shoes produced and the heated pressure conduits through which the adhesive is supplied to the last and returned therefrom to the reservoir obstruct the operators of the machine and, because they are frequently damaged, have a tendency to cause accidents.

SUMMARY OF THE INVENTION

It is, accordingly, an object of the present invention to overcome the aforementioned disadvantages.

An additional object of the invention is to provide an apparatus for carrying the novel method into effect.

In pursuance of the above objects and others which will become apparent hereafter, one feature of my invention resides in the provision of a machine for adhesively connecting parts of a shoe. This machine comprises, briefly stated, support means for supporting a last and a material on said last, such support means having a contact surface. Distributing means is provided on the contact surface for promoting the spreading of adhesive applied onto the surface. Heating means heats the support means at least in the region of the surface. Supply means is located remote from the heating means so as not to exchange heat therewith, and serves to supply quantities of particulate dry powdered substance of thermoplastic adhesive. Finally, the machine includes transfer means for transferring quantities of the adhesive from the supply means to the support means and for depositing such quantities on the contact surface at a plurality of spaced locations so that the adhesive melts and spreads on the surface via the distributing means.

The adhesive suitable for this purpose will be a particulate dry powdered thermoplastic material which is flowable in particulate state, with the particle size being selected in accordance with prevailing requirements. The adhesive is withdrawn at normal temperature, that is not in heated condition, from a supply and is deposited by a special metering and transfer device—which may be cooled if necessary—onto the contact surface of the last support. When it is applied it is still in particulate or granular dry powdered state and only such quantities of adhesive are deposited on the contact surface as are necessary to provide the narrow adhesive zone along which the marginal portions of the shoe upper are to be bonded to the margin of the insole. The transfer device remains exposed only for brief periods of time to the elevated temperature of the heated last support so that it will require either no cooling or can be adequately air cooled if necessary.

According to the invention the container containing the supply of particulate thermoplastic adhesive material has a lower opening which can be closed by a slide member serving to meter the quantity of adhesive to be dispensed at any one time. There is further provided a vibration-producing device, a guide means for the transfer device and means for preventing the quantities of adhesive carried by the transfer device from being dispensed prematurely. In accordance with one embodiment the transfer device is provided with a plurality of bores which are so arranged that, when the transfer device is moved to dispensing position above the contact surface of the last support, they will be juxtaposed with the zone of the surface along which the adhesive bonding is to take place. The means for preventing premature dispensing comprises an element having bores which are arranged in the same manner as the bores of the transfer device but out of registry with the same until the transfer device moves to dispensing position above the contact surface, at which time the bores of the aforementioned means move into registry with the bores of the dispensing device so that particulate adhesive contained in the latter can now descend under the influence of gravity onto the contact surface. According to the invention it is advisable to provide a cover means, such as clamp plugs, e.g., of plastic which permit selective covering of individual zones to prevent the deposition of adhesive in these zones on the contact surface; this is necessary in the manufacture of certain types of shoes, for instance open-toed shoes.

The contact surface facing the last and corresponding to the last shape, is provided with a network of channels, such as grooves, communicating spaces between a plurality of spaced projections, or the like, through which the melting adhesive can spread and which at the same time serve to retain adequate quantities of the melting adhesive.

In accordance with a further embodiment of the invention the supply of heat to the melting zone of the contact surface is provided via pressure bolts located in elastically mounted sleeves and consisting of material having good thermoconductivity, such as aluminum or copper. In this case the particulate adhesive is liquefied in the melting zones defined by these arrangements and is deposited on the insole by pressure of the sleeves which is exerted upon the last when the latter is placed onto the contact surface.

With the construction according to the present invention the time for liquefying the particulate thermoplastic material is very short, namely on the order of only a few seconds, and this has the additional advantage of reducing the contamination of the ambient atmosphere. It is well known that the adhesives in question yield noxious fumes when heated, but with the reduced heating times which are achieved according to the invention the quantities of such fumes which develop are considerably decreased and actually negligible. Aside from this there is of course the fact that reduced heating times result in a consequent reduction of the necessary heat energy. The improved bonding ability of the adhesives resulting from the fact tat no adhesive is retained in circulation and caused to repeatedly melt and solidify, assures better bonding of the uppers to the insoles and consequently decreases the number of rejects. Finally, the heated pressure conduits known from the prior art are eliminated which permits better access to the apparatus, reduces the possibility of accidents and assures a more accurate and economical dispensing of the adhesive.

BRIEF DESCRIPTION OF THE DRAWING

FIG. 1 is a diagrammatic perspective top view of an apparatus according to the present invention, with all components not germane to an understanding of the invention having been omitted;

FIG. 2 is a fragmentary detailed view of a further embodiment of the last supper; and FIG. 3 is a section taken on the line A–B of FIG. 2.

DESCRIPTION OF THE PREFERRED EMBODIMENTS

It is again emphasized that the embodiments in FIG. 2 shows only such components of the apparatus as are essential for an understanding of the invention. All other components have been omitted and are of a character well known to those skilled in the art and readily identifiable from the context of the following detailed description.

With this in mind, it is pointed out that in FIG. 1 the reference character H identifies a hopper into which particulate thermoplastic adhesive is introduce. Reference numeral 1' identifies the inlet opening of the hopper and reference numeral 1" the lower outlet opening thereof. A support 1 carries the hopper H or may be of one piece therewith. The support 1 is provided with suitable guide means for a closure member 13 which may be moved across the outlet opening 1" to close the same. In the illustrated embodiment the member 13 is shown as a sliding plate member to simplify explanations. In actual practice it is preferred to construct it in the form of interengaging slide members of cylinder-sector-shaped configuration.

Further, guide means of suitable type, not illustrated in detail because its construction is not essential for the invention, is provided in the support 1 and mounts a sliding transfer member 2 for movement in the direction of the double-headed arrow. Arranged below the transfer member 2 is a closure member 3, both of them being plate shaped. The members 2 and 3 are broken away to the left of the hopper H to permit a sectional illustration so as to more clearly show the relationship which they assume with reference to one another. The member 2 is provided with a plurality of bores 2' arranged in desired manner, for instance as illustrated. These bores 2' extend all the way through the member 2 from the upper to the lower side thereof. The member 3 is provided with a corresponding plurality of bores 3', shown in broken lines and normally located out of registry with the lower ends of the bores 2'. The member 2 and 3 together are movable in the direction of the double-headed arrow as mentioned before and when they are moved towards the right in FIG. 1 the bores 2' are placed below the outlet end 1" of hopper H. The plate 13 is then withdrawn from the outlet opening 1" and particulate adhesive enters into the bores 2'. Thereupon the plate 13 is restored to the illustrated position and the members 2 and 3 are moved together towards the left, as seen in FIG. 1. The part of the machine thus far described is located in the zone 10 which is not heated, that is which is at normal ambient temperature. Located to the left of the zone 10, in a zone 11, are further parts of the machine of which only the last support 4 is shown as being germaine to the invention. The configuration of the last support 4 is readily evident from FIG. 1. Associated with the last support 4 is a heating plate 5 which in the illustrated embodiment is electrically heated by means of the conductors C which are connected in suitable manner with a source of electric energy.

The construction of such heating plates is well known.

The last support 4 has an upper contact surface 4' onto which the last with the insole is to be placed in known manner. The configuration of the contact surface 4' corresponds to the outline of the bonding zone along which the material of the upper is to be bonded to the insole. According to the invention the contact surface 4' is provided with projections, depressions, grooves, or any other suitable means 4" through which melting adhesive can spread.

In operation the members 2 and 3 are moved towards the left until the bores 2' are located above the contact surface 4' in registry therewith. When the member 2 has reached this end position the member 3 moves with respect to the member 2 so that the bores 3' are in registry with the lower open ends of the bores 2', permitting the quantities of particulate adhesive to fall by gravity onto the contact surface 4' where the heat of the latter converts them within seconds to liquefied state so that they spread into the dabs D. The manner in which the member 3 moves with respect to the member 2 need not be further described because instrumentalities for this purpose are well known to those skilled in the art. The member 3 now returns to its original position with respect to the member 2 and both of them move towards the right so that the bores 2' are again located below the outlet opening 1'. The dwell time of the members 2 and 3 in the vicinity of the last support 4 is so short that they are not significantly heated so that no melting of adhesive material in the bores 2' can take place. Of course, if necessary air cooling may be provided for the members 2 and 3.

The last with the insole (neither of which is illustrated) is then placed onto the contact surface 4' for transfer of the melted adhesive to the insole. Subsequently, the marginal portions of the shoe upper are bonded to the thus prepared insole in known manner.

Reference numeral 12 identifies a vibrating device of known construction which serves to produce vibrations in the members 1 and H so as to facilitate downward flow of the particulate adhesive into the outlet opening 1".

The plugs 15, 16, 17 serve for closing part of the bores 2' in cases, where selective covering of the bores is desired, for instance in the case of open-toed shoes. The covering plugs be made of plastic material and may be provided with one or more beads 19, 20 for wedging the plugs 15' in the bores.

FIGS. 2 and 3 illustrate in fragmentary detail a further embodiment of the last support 4. Like reference numerals identify like elements as in FIG. 1. In FIGS. 2 and 3, however, the contact surface 4' is not provided with the grooves 4" or analogous means. Instead, it is provided with bores in which there are arranged head bolts 7, surrounded in part by helical expansion springs 8, via which it is in heat-exchange contact with the heating plate 5. The upper parts of the bolts 7 are surrounded by sleeves 6 which are urged outwardly of the bores and beyond the surface 4' by the springs 8. Thus, the heat is concentrated into the outwardly projecting portions of the sleeves 6 and the particulate adhesive falls from the bores 2' into the upper confines of the sleeves 6 to rest on the upper end faces of the bolts 7 which are flush in this embodiment with the contact surface 4'. When the last with the insole is placed onto the last support 4 it depresses the sleeves 6 until their upper ends are flush with the contact surface 4', whereby the melted adhesive on the upper end faces of the bolts 7 is transferred in form of dots onto the insole.

It will be understood that each of the elements described above, or two or more together, may also find a useful application in other types of constructions, differing from the types described above.

While the invention has been illustrated and described as embodied in an apparatus for adhesively connecting parts of a shoe, it is not intended to be limited to the details shown, since various modifications and structural changes may be made without departing in any way from the spirit of the present invention.

What is claimed as new and desired to be protected by Letters Patent is set forth in the appended claims.

1. In a machine for adhesively connecting parts of a shoe, in combination, support means for supporting a last and a material on said last, said support means having a contact surface; distributing means on said contact surface for promoting the spreading of adhesive applied onto said surface; heating means for heating said support means at least in the region of said surface; supply means remote from said heating means so as not to exchange heat therewith, for supplying quantities of particulate dry powdered substance of thermoplastic adhesive; and transfer means for transferring quantities of said adhesive from said supply means to said support means and for depositing said quantities on said surface at a plurality of spaced locations, so that the adhesive melts and spreads on said surface via said distributing means.

2. In a machine as defined in claim 1, said transfer means being far from connection to and engagement with said support means.

3. In a machine as defined in claim 1, said distributing means comprising a network of channels through which said adhesive may flow upon melting.

4. In a machine as defined in claim 1, said transfer means comprising a slide member provided with a plurality of bores therethrough spaced and arranged in a predetermined relationship, said slide member having an upper side and a lower side, and further comprising a closure member arranged below and adjacent said lower side, said closure member being provided with a plurality of bores arranged identically to those of said slide member but normally out of registry with the lower ends of the same, said bores of said slide member receiving adhesive at said supply means and said closure member being movable relative to said slide member to a position of registry of the respective bores with one another when said slide member is located above said surface so as to permit said adhesive to issue from said bores of both of said members and onto said surface, said bores of said slide member permitting to be selectively closed, for instance by plugs of plastic material provided with one or more wedging beads, in cases where thermoplastic adhesive is to be applied only on part of said surface.

5. In a machine as defined in claim 1, said transfer means comprising a pair of superimposed members each having a plurality of bores arranged in identical patterns but normally out of registry with one another, said members being movable from said supply means to a position above said surface for receiving adhesive material into the bores of the upper of said members at said supply means and for depositing such adhesive material onto said surface when said members are located above the same and in response to relative movement of said members to effect registry of their respective bores.